United States Patent
Ferencz et al.

(10) Patent No.: US 6,713,184 B1
(45) Date of Patent: Mar. 30, 2004

(54) ADHESIVE AND THE UTILIZATION THEREOF IN COMPOSITE MATERIALS

(75) Inventors: Andreas Ferencz, Duesseldorf (DE); Eduard F. Taal, Duesseldorf (DE); Heike Eisenberger, Duesseldorf (DE); Herbert Fischer, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/555,709

(22) PCT Filed: Nov. 27, 1998

(86) PCT No.: PCT/EP98/07667

§ 371 (c)(1),
(2), (4) Date: Jul. 19, 2000

(87) PCT Pub. No.: WO99/28406

PCT Pub. Date: Jun. 10, 1999

(30) Foreign Application Priority Data

Dec. 2, 1997 (DE) .......................................... 197 63 474
Jul. 23, 1998 (DE) .......................................... 198 33 191

(51) Int. Cl.⁷ .......................... C09J 167/02; B32B 27/04
(52) U.S. Cl. .................... 428/423.7; 428/480; 428/481; 428/483; 156/332; 524/306; 524/311; 525/411; 525/438; 525/440; 525/444
(58) Field of Search .............................. 428/423.7, 480, 428/481, 483; 156/332; 524/306, 311; 525/411, 438, 440, 444

(56) References Cited

U.S. PATENT DOCUMENTS 4,504,652 A * 3/1985 Widder et al. .............. 528/480
5,552,495 A * 9/1996 Miller et al. ................. 525/437

FOREIGN PATENT DOCUMENTS

| EP | 0 705 895 | 4/1996 |
|----|-----------|--------|
| EP | 0 741 177 | 11/1996 |
| EP | 0 741 178 | 11/1996 |
| JP | 05 339557 | 12/1993 |
| WO | WO 84/02144 | 6/1984 |
| WO | WO 95/10577 | 4/1995 |
| WO | WO 96/16682 | 6/1996 |
| WO | WO 97/04036 | 2/1997 |

OTHER PUBLICATIONS

Database, AN 94–032009, XP002099924.
ISO Standards 10708 and 10708 (modified).
Rompp Lexikon Chemie, 10$^{th}$ Edition, vol.1, (1996).
Ring and Ball Method for Softening Point by Ring and Ball Apparatus, ASTM E28.
DIN 54900, Teil 2.

\* cited by examiner

Primary Examiner—Patricia A. Short
(74) Attorney, Agent, or Firm—Stephen D. Harper; Michael F. Carmen

(57) ABSTRACT

An adhesive useful in forming composites includes components A and B. Component A includes at least one polyester with a molecular weight ($M_n$) of at least 8000 and has a total enthalpy of fusion of at most 20 mJ/mg. Component B includes at least one polyester with a molecular weight (Mn) of less than 8000 and a glass transition temperature of at most 60° C. The adhesive preferably has a melt viscosity of 500 to 25,000 mPas (Brookfield RVT DVII, 140° C., spindle 27) and a softening point of 70 to 100° C. (ASTM E28).

17 Claims, No Drawings

ADHESIVE AND THE UTILIZATION THEREOF IN COMPOSITE MATERIALS

This invention relates to an adhesive and to its use, more particularly in the production of a composite material, for example for a composite material containing at least one nonwoven.

Adhesives are increasingly entering many areas of daily life because, in general, they represent a simple, permanent and safe method of fixing materials. In the production of composite materials in particular, adhesives have been successfully used in the creation of durable bonds. Whereas the bonding of materials with a relatively polar structure and hence generally with a relatively polar surface to one another generally presents no difficulties under normal circumstances, the bonding of materials with a substantially nonpolar surface is generally problematical. However, even greater difficulties can be involved in the bonding of substantially nonpolar materials to polar materials because the adhesive to be used is intended to show adhesion to both materials despite their different polarities.

Accordingly, problems in the production of composite materials can arise, for example, when at least one of the materials to be bonded is a polyolefin. Polyolefins generally show poor adhesion to many adhesives so that polyolefin materials are difficult and, in some cases, impossible to bond to one another or to other materials in composite materials.

Composite materials of the type used in particular in the field of personal hygiene are mostly materials with a limited useful life which, for example, are discarded after being used only once, more particularly disposable products. Accordingly, since the space available for waste disposal is decreasing, increasing interest is being shown in composite materials which have at least one at least substantially biodegradable constituent in order to preserve waste disposal space in the long term.

There is an increasing trend towards at least partly biodegradable systems, particularly in the case of such articles as packs, packaging foams, bonding materials, films, bags, medical articles, for example plasters or bandages, or hygiene articles, for example diapers, tampons and sanitary napkins. Since articles such as these are often composed of various materials and, generally, comprise at least one bond, it is desirable with a view to improving their biodegradability for the adhesive bond itself to be at least substantially biodegradable while, at the same time, enabling even different materials to be reliably bonded.

Thus, WO 97/04036 describes an adhesive containing polyhydroxy-alkanoates as biodegradable (co)polymers. The adhesive is suitable both for the production of nonwovens and for the production of absorbent materials of the type used, for example, in sanitary articles.

EP-A-0 705 895 relates to a starch-based hotmelt adhesive and to its use for bonding nonwovens to similar or different substrates. The adhesive contains 20 to 60% by weight of a starch ester with a medium or high degree of substitution. If the adhesive in the composite material is contacted with water at a certain temperature, the nonwoven can be separated from the substrate.

EP-A0 741 177 relates to biodegradable hotmelt adhesives of polylactides. This document makes particular mention of polyhydroxybutyrate/polyhydroxyvalerate polymers which contain sucrose benzoate as tackifier. The hotmelt adhesives are used for bonding packs, for example paperboard articles, in book binding and for the production of fabric-based composites or disposable sanitary articles.

EP-A-0 741 178 relates to biodegradable hotmelt adhesives of polyesters which contain at least one hydroxy group per recurring unit. The described polyesters are combined with such additives as tackifiers, plasticizers or stabilizers. The polyesters are prepared by reacting dicarboxylic acids with diglycidyl ethers.

Where they are used as adhesives, the biodegradable polymers known from the prior art have disadvantages which prevent or at least restrict their use in various fields, particularly when the adhesive is expected to meet stringent thermal or mechanical stability requirements. Thus, polyhydroxybutyrates, polyhydroxyvalerates and polylactides, for example, show poor mechanical and thermal stability by comparison with conventional hotmelt adhesives which makes them appear unsuitable for high-temperature applications and imposes exacting demands on processing in the melt. In addition, many biodegradable adhesives form bonds with inadequate strength at low temperatures.

Accordingly, a first problem addressed by the present invention was to provide an adhesive which would form a strong bond between materials of which at least one contains a polyolefin, even in cases where dermatologically compatible coatings are used in hygiene products.

Another problem addressed by the present invenjion was to provide an adhesive for the production of composite materials which would be at least partly biodegradable, would satisfy stringent mechanical and thermal stability requirements, would establish a strong adhesive bond even at low temperatures and would lend itself to production from readily accessible, commercially available raw materials, for example in conventional polycondensation reactors.

These problems have been solved by an adhesive which contains components A and B, components A and B being polyesters with different properties and/or different compositions as described in more detail hereinafter.

Accordingly, the present invention relates to an adhesive containing components A and B in which a) component A contains at least one polyester with a molecular weight ($M_n$) of at least 8000 and has a total enthalpy of fusion of at most 20 mJ/mg and b) component B contains at least one polyester with a molecular weight ($M_n$) of less than 8000 and, more particularly, in the range from 1000 to 6500 and a glass transition temperature of at most 60° C. and, more particularly, in the range from −10 to 40° C., the adhesive having a melt viscosity of 500 to 25,000 mPas (Brookfield RVT DVII, 140° C., spindle 27) and a softening point of 70 to 100° C. (ASTM E28).

In the context of the present invention, a polyester is understood to be a polymer which can be obtained either by ring-opening polymerization of lactones or by polycondensation of hydroxycarboxylic acids or by polycondensation of polyols and polycarboxylic acids, preferably diols and dicarboxylic acids, optionally with a small percentage content of trifunctional or higher alcohols and/or carboxylic acids.

Terms used in the present specification are defined in the following.

The term "amorphous" applies to polymers which have only a very small percentage content, if any, of crystalline structures, i.e. are substantially isotropic. Accordingly, "amorphous" polymers are polymers which, in differential thermoanalysis (DTA, normally differential scanning calorimetry—DSC), show no melt transition or which have an enthalpy of fusion of less than 20 mJ/mg, preferably less than 15 mJ/mg and more preferably less than 10 mJ/mg. Accordingly, these polymers may have enthalpies of fusion of, for example, 18, 17, 16, 14, 13, 12, 11, 9 or 8 mJ/mg. However, the values measured for. the enthalpy of fusion of the particular polymer may even be lower, for example 5, 4, 3 or 2 mJ/mg or less. In one preferred embodiment, the enthalpy of fusion of such a polymer is around 0 mJ/mg. Another criterion which the expert may use to judge whether a polyester is amorphous is the diffraction of X-rays, electron beams or neutron beams at solids.

The term "partly crystalline" means that the corresponding polymer contains crystalline structures, i.e. is not completely isotropic. Typically, these polymers are polymers which, in differential thermoanalysis (DTA, normally differential scanning calorimetry—DSC), show a melt transition of which the enthalpy of fusion is greater than 20 mJ/mg.

The "glass transition temperature" is the term normally used in polymer chemistry for the temperature at which molecular movements of relatively large chain segments can be detected in a polymer. In general, the detectable lower limit is at about 5 chain atoms in the polymer backbone, depending on the method used.

The term "biodegradable" relates to a polymer which is degraded—in the most favorable case completely—to carbon dioxide and water by micro-organisms or under the effect of enzymes. Methods for determining biodegradability can be found, for example, in the "OECD Guidelines for Testing of Chemicals" 301 A to F and in ISO Standards 10708 and 10708 (modified). An overview can be found in Römpp Lexikon Chemie, 10th Edition, Vol. 1 (1996), Georg Thieme Verlag, Stuttgart, N.Y.

Component A present in the adhesive according to the invention contains an amorphous polyester with a number average molecular weight ($M_n$) of at least about 8000. In one preferred embodiment of the invention, the polyester present in component A has a molecular weight of at least about 9000 and at most about 30,000, a polyester with a molecular weight ($M_n$) of about 10,000, 12,000, 14,000, 16,000 or 18,000 being preferred.

Component A may contain, for example, only a single type of polyester or even a mixture of two or more different polyesters with a number average molecular weight ($M_n$) of at least about 8000.

If component A contains only one type of polyester, the enthalpy of fusion of that polyester in one advantageous embodiment of the invention is at most 20 mJ/mg. If a mixture of two or more polyesters is used as component A in the adhesive according to the invention, the maximum value shown for the enthalpy of fusion is the total enthalpy of fusion of component A. If, for example, component A contains a mixture of two types of polyesters with an individual molecular weight ($M_n$) of at least 8000, one of the two polyesters can have an enthalpy of fusion of more than about 20 mJ/mg, i.e. may be partly crystalline, providing the total enthalpy of fusion of component A is no more than 20 mJ/mg. The same proviso also applies when comnponent A contains a mixture of three or more types of polyesters. In this case, one or more of the polyesters may be partly crystalline providing the total enthalpy of fusion of component A is at most 20 mJ/mg.

In one preferred embodiment of the invention, the glass transition temperature of component A is at most 60° C. and, preferably, in the range from about –10° C. to about 40° C. and, more preferably, in the range from about 5° C. to about 20° C.

Component A advantageously has a viscosity of about 5000 to about 100,000 mPas at 90° C. (Brookfield CAP 2000) and in the range from about 400 to about 15,000 mPas at 140° C. (Brookfield RVT DII, spindle 27, 10 r.p.m.).

A viscosity of component A lying in this range generally provides for a particularly advantageous processing viscosity, depending on the overall composition of the adhesive according to the invention. In one preferred embodiment, the viscosity is in the range from about 7000 to about 20,000 mPas, a viscosity of about 8000 to about 15,000 mPas being particularly preferred.

The OH value of component A is advantageously in the range from about 1 to about 20 mg KOH/g component A. For example, the OH value is of the order of 5, 8, 9, 10, 11, 13 or 15 mg KOH/g.

The adhesive according to the invention contains at least one polyester with a molecular weight ($M_n$) of less than 8000 and, more particularly, in the range from about 400 to about 6500, as component B. Preferred upper limits for the molecular weight ($M_n$) are, for example, about 5000, about 4000 or about 3000 while preferred lower limits are about 1000, about 1500 or about 2000. For example, polyesters suitable for use in component B have molecular weights ($M_n$) of about 1500 to about 3500.

In special cases, for example for establishing a certain melt viscosity, it can be of advantage for component B to contain a low molecular weight polyester with a molecular weight ($M_n$) of about 400 to about 800 and, more particularly, in the range from about 400 to about 500.

The upper limit to the glass transition temperature of polyesters suitable for use in component B is normally about 60° C. The upper limit is advantageously about 40° C. or lower, for example 30° C. or, more particularly, about 20° C. A suitable lower limit for the glass transition temperature is about –80° C., lower limits of about –40° C. or –30° C., more particularly about –15° C., being particularly suitable.

Polyesters with a glass transition temperature of about 5° C. to about 20° C. are particularly suitable.

In certain cases, for example in order to guarantee the flexibility of an adhesive bond even at low temperatures, polyesters with a glass transition temperature of about –40° C. to about –15° C. are particularly suitable. In special cases, polyesters with a glass transition temperature below –40° C., for example in the range from about –40° C. to about –80° C., are also suitable for this purpose.

The polyester used in component B may be amorphous or partly crystalline, but is preferably amorphous In the sense of the above definition.

In one preferred embodiment, therefore, component B contains an amorphous polyester with a molecular weight ($M_n$) of about 1500 to about 4000, a glass transition temperature $T_g$ of about 5 to about 20° C. and a viscosity of about 3500 to about 25,000 mPas (Broofkield CAP 2000, 90° C., cone 6, 50 r.p.m., measuring time 25 s) as component B1.

In another preferred embodiment, component B contains an amorphous polyester with a molecular weight ($M_n$) of 400 to 4000 and a glass transition temperature $T_g$ of –40 to –15° C. as component B2.

In another preferred embodiment, component B contains an amorphous polyester with a molecular weight ($M_n$) of less than 500 and a glass transition temperature $T_g$ below –40° C. as component B3.

Component B may contain, for example, only one type of polyester. For example, component B may consist of any polyester which falls within the general definition of component B, more particularly of one of the above-mentioned polyesters B1, B2 and B3. However, to obtain particularly good adhesion properties, particularly on polyolefin surfaces, it may be preferable for component B to contain more than one polyester. For example, component B may contain one of components B1, B2 and B3 or a mixture of two or more thereof and, in addition, another polyester falling within the general specification of component B.

In one preferred embodiment, component B contains a mixture of at least two polyesters which have different glass transition temperatures or different molecular weights ($M_n$) or both. The difference in their glass transition temperatures is preferably at least about 3° C. and more preferably at least about 10° C. while their molecular weights ($M_n$) preferably differ by at least about 500 and, more preferably, by at least about 1000.

In another preferred embodiment, component B contains a mixture of at least two of components B1, B2 and B3. In this case, at least one of the components B1, B2 and B3 used may be amorphous while another of the components B1, B2 and B3 used may be partly crystalline.

Basically, the polyesters suitable for use in the adhesive according to the invention may be any type of polyester which, on the strength of its properties, fulfills the above-mentioned specifications for use in component A and component B. In one preferred embodiment, the polyesters are biodegradable.

These polyesters are, for example, polyesters produced by ring-opening polymerization of lactones or by polycondensation of hydroxycarboxylic acids. Such polyesters include inter alia hydroxybutyrate/hydroxyvalerate polyesters, poly-lactides and/or homopolyesters or copolyesters which may be prepared using lactones and/or hydroxy acids.

However, the polyesters are preferably obtained by polycondensation of alcohol and acid components, preferably by polycondensation of a dicarboxylic acid or a mixture of two or more dicarboxylic acids and a diol or a mixture of two or more diols.

In one preferred embodiment, component A contains a polyester which is synthesized from at least a first and a second acid component and at least a first alcohol component.

In another preferred embodiment, component B contains a polyester synthesized from at least a first and a second acid component and at least a first alcohol component.

The terms "acid component" and "alcohol component" are used both in connection with the synthesis of a polyester and in connection with the polyester molecule itself. Accordingly, the term "acid component" stands not only for the free acid or the salt of the free acid, it also encompasses—in the context of the polyester synthesis—derivatives of free acids suitable for the synthesis of polymers. Such derivatives may be for example, the esters of the acid with aliphatic $C_{1-4}$ alcohols and the anhydrides. In connection with the polyester molecules themselves, "acid component" stands for the acid structural element incorporated in the polymer backbone via ester bonds. The same also applies to "alcohol component" in the context of the present specification.

In principle, any aliphatic and aromatic polycarboxylic acids suitable for the synthesis of polyesters having the properties required for components A and B may be used as a first and a second acid component.

Aliphatic or cydoaliphatic polycarboxylic acids optionally containing olefinically unsaturated double bonds or aromatic polycarboxylic acids or mixtures of two or more thereof may be used both as a first and as a second acid component. Aliphatic or cycloaliphatic di- or tricarboxylic acids or aromatic di- or tricarboxylic acids or mixtures of two or more thereof are preferred.

Suitable aliphatic or cycloaliphatic polycarboxylic acids are polycarboxylic acids containing about 4 to about 40 carbon atoms and preferably about 5 to about 25 carbon atoms. Such polycarboxylic acids are, in particular, butane dicarboxylic acid (succinic acid), pentane dicarboxylic acid (glutaric acid), hexane dicarboxylic acid (adipic acid), heptane dicarboxylic acid (pimelic acid), octane dicarboxylic acid (suberic acid), nonane dicarboxylic acid (azelaic acid), decane dicarboxylic acid (sebacic acid) and optionally branched isomers and higher homologs thereof and maleic acid, fumaric acid, dimeric or trimeric fatty acids, cyclohexane dicarboxylic acid, cyclohexene dicarboxylic acid, cyclohexadiene dicarboxylic acid, endomethylene hexahydrophthalic acid or cyclohexane tricarboxylic acid. In the context of the foregoing observations, the anhydrides of the polycarboxylic acids mentioned (where they exist) or esters thereof with lower alcohols containing about 1 to about 5 carbon atoms also fall within the definition of "acid component".

Polycarboxylic acids containing about 6 to about 24 carbon atoms may be used as the aromatic polycarboxylic acids. Such polycarboxylic acids are, in particular, phthalic acid, isophthalic acid, terephthalic acid and trimetlitic acid.

In one particularly preferred embodiment of the invention, component A or component B or component A and component B is/are synthesized from an aromatic acid component as a first acid component In a particularly preferred embodiment of the present invention, component A contains a polyester synthesized from an acid selected from o-phthalic acid and isophthalic acid, more particularly from isophthalic acid, as a first acid component.

Polyesters particularly suitable for use as a constituent of component A are synthesized from an aliphatic dicarboxylic acid as a second acid component. Such acids are, in particular, adipic acid or sebacic acid.

A polyester particularly suitable for use as a constituent of component A is synthesized from isophthalic acid as a first acid component and adipic acid as a second acid component, the first acid component and the second acid component generally being present in a molar ratio of about 0.5:1.5 to about 1.5:0.5 and, more particularly, about 0.8:1.2 to about 1.2:0.8.

In one preferred embodiment of the invention, component B contains a polyester synthesized from an acid selected from o-phthalic acid, isophthalic acid or terephthalic acid, more particularly terephthalic acid or o-phthalic acid, as a first acid component.

Polyesters particularly suitable for use as a constituent of component B are synthesized from an aliphatic dicarboxylic acid as a second acid component. Such acids are, in particular, adipic acid and sebacic acid.

A polyester particularly suitable for use as a constituent of component B is synthesized from o-phthalic acid or terephthalic acid as a first acid component and from adipic acid as a second acid component, the first acid component and the second acid component generally being present in a molar ratio of about 0.5:1.5 to about 1.5:0.5 and, more particularly, about 0.8:1.2 to about 1.2:0.8.

In special cases, it can be of advantage for a polyester present in component B to be synthesized from three acid components. In general, a first and a second acid component are aromatic acid components while a third acid component is an aliphatic or a cycloaliphatic acid component. Terephthalic acid and isophthalic acid are particularly suitable as first and second acid components while adipic acid is preferred as the third acid component.

The polyesters suitable for use in components A and B are synthesized from at least a first alcohol component. It is preferred, particularly for polyesters suitable for use in component B, for a second alcohol component to be involved in the synthesis. In one preferred embodiment of the invention, component B contains a polyester synthesized from only one alcohol component, for example as component B1, in admixture with another polyester synthesized from two alcohol components, for example as component B2.

Polyhydric alcohols, for example dihydric alcohols, containing 2 to 4 carbon atoms are suitable both as first and as second alcohol component. Ethylene glycol, 1,2-propylene glycol, 1,3-propylene glycol, 1,2-butylene glycol, 1,3-butylene glycol, 2,3-butylene glycol and 1,4-butylene glycol are particularly suitable. Also suitable are dihydric alcohols containing 5 or more carbon atoms, for example neopentyl glycol, the isomeric pentane diols and hexane diols, dianhydrosorbitol or ether alcohols, such as diethylene glycol or triethylene glycol.

Besides the dihydric alcohols mentioned, trihydric or higher alcohols may also be involved in small quantities as alcohol component in the synthesis of the polyesters intended for use in component A or component B. Such trihydric or higher alcohols are, for example, glycerol, trimethylol propane, pentaerythritol and sugar alcohols, such as glucose or sorbitol. The hydroxy groups of the trihydric or higher alcohols may be partly esterified, i.e. except for two remaining hydroxy groups, with carboxylic acids containing 1 to about 24 carbon atoms, more particularly with monofunctional fatty acids.

Other suitable alcohol components in the context of the present invention are the ether alcohols (hydroxyfunctional ethers) of the alcohols mentioned above—both ethers obtainable from the reaction of the same alcohols and mixed ethers obtainable by reacting different alcohols with one another.

Other alcohol components suitable for use in accordance with the present invention are the reaction products of the above-mentioned alcohols with $C_{1-4}$ alkylene oxides, an average of about 1 to about 10 alkylene oxide molecules preferably having reacted with one OH group of the alcohol.

The second alcohol component may be selected from any of the alcohols which may be used as the first alcohol component. The first and the second alcohol component differ, for example, either in their molecular weight, i.e. the second alcohol component has a higher molecular weight than the first alcohol component, or—where compounds having the same molecular weight are involved—the second alcohol component has another distinguishing feature, for example another substitution pattern of the functional groups or another, for example branched, carbon skeleton.

Accordingly, the polyesters suitable for use as component A or component B in the adhesive according to the invention preferably contain polyesters synthesized in such a way that they contain d) an acid selected from o-phthalic acid, isophthalic or terephthalic acid as a first acid component, e) an acid selected from adipic acid and sebacic acid as a second acid component, f) ethylene glycol, neopentyl glycol, 1,2-propylene glycol, 1,3-propylene glycol, the isomeric butylene glycols, pentane diols and hexane diols, dianhydrosorbitol, diethylene glycol, triethylene glycol, pure or mixed ethers thereof or reaction products thereof with $C_{1-4}$ alkylene oxides as a first alcohol component.

In the case of a polyester suitable for use in component A, ethylene glycol is preferably involved in the synthesis as a first alcohol component.

Polyesters suitable for use in component B may be synthesized, for example, from only one alcohol component. However, component B preferably contains one or more polyesters synthesized from two or more alcohol components. Ethylene glycol, propane-1,2-diol, butane-1,4-diol, neopentyl glycol and pentane-2,3-diol, for example, are particularly suitable for use in such polyesters, polyesters synthesized from ethylene glycol and propane-1,2-diol, butane-2,3-diol, pentane-2,3-diol or dianhydrosorbitol as alcohol components being particularly preferred with the biodegradability of the adhesives according to the invention in mind.

One example of a polyester suitable as component A is a polyester synthesized from isophthalic acid, adipic acid, diethylene glycol and ethylene glycol.

One example of a polyester suitable as component B1 is a polyester synthesized from adipic acid, phthalic acid, propane-1,2-diol and ethylene glycol or from adipic acid, phthalic acid, butane-2,3-diol and ethylene glycol.

One example of a polyester suitable as component B2 is a polyester synthesized from terephthalic acid, isophthalic acid, adipic acid and butane-1,4-diol.

The polyesters used in components A and B in accordance with the invention may optionally be modified in their original molecular weight ($M_n$) by chain extension. For example, a polyester with a molecular weight ($M_n$) of about 4000 suitable for use in component A may be doubled or tripled in its molecular weight ($M_n$) by corresponding chain extension, so that the necessary molecular weight ($M_n$) of about 8000 or about 12,000 is ultimately obtained. In carrying out the chain extension, it is important to ensure that the polyester still satisfies the molecular weight ($M_n$) and glass transition temperature criteria after chain extension.

The chain extension is best carried out with polyesters bearing a terminal OH group or a carboxylic acid group at the end of the polymer chain. Polyesters with terminal OH groups are particularly suitable for chain extension.

The chain extension itself is carried out with chain-extending agents which are capable of reacting with two terminal groups of the polyester and thus connecting two polyester molecules with an increase in molecular weight ($M_n$). Molecules containing at least two epoxide groups, for example diglycidyl ethers of dihydric alcohols and epichlorohydrin, are particularly suitable for this purpose.

Compounds containing at least two isocyanate groups in the molecule, for example the diisocyanates typically used in polyurethane production, such as toluene diisocyanate (TDI), hexamethylene diisocyanate (HDI), the isomeric diphenyl methane diisocyanates or isophorone diisocyanate (IPDI), are also particularly suitable.

In one preferred embodiment of the invention, therefore, the polyesters used in components A and B are chain-extended with diisocyanates. The molar ratio of polyester to diisocyanate is at least about 4:3 (corresponding to an average quadrupling of the molecular weight ($M_n$) of the polyester), so that on average each polymer chain contains about 6 urethane groups. The upper limit to the polyester-diisocyanate ratio is about 5:1 and, more particularly, about 3:1 or 2:1 which—in the last case—substantially corresponds to an average doubling of the molecular weight ($M_n$) with an average of two urethane groups per polyester molecule. Any values between these two limits may be correspondingly used in accordance with the present invention.

In one preferred embodiment of the invention, component A consists of one or two polyesters which satisfy the abovementioned criteria for use in component A. In another preferred embodiment, component B consists of two or three polyesters which satisfy the above-mentioned criteria for use in component B.

Components A and B may be present In the adhesive according to the invention in different percentage contents, based on the adhesive as a whole. In general, component A makes up about 20% by weight to about 95% by weight of the adhesive as a whole, preferably about 30% by weight to about 75% by weight and, in one particularly preferred embodiment, about 35% by weight to about 45% by weight.

Component B advantageously makes up about 80% by weight to about 5% by weight of the adhesive as a whole and preferably about 70% by weight to about 25% by weight. In one preferred embodiment, component B makes up about 55% by weight to about 65% by weight.

The adhesive according to the invention may optionally contain additives. The additives make up as much as about 60% by weight of the adhesive as a whole.

Additives suitable for use in accordance with the present invention include, for example, plasticizers, wax diluents, stabilizers, antioxidants, dyes or fillers.

The plasticizers used are, for example, plasticizers based on phthalic acid, more particularly dialkyl phthalates, preferred plasticizers being phthalic acid esters which have been esterified with a linear alkanol containing about 6 to about 12 carbon atoms. Dioctyl phthalate is particularly preferred.

Other suitable plasticizers are benzoate plasticizers, for example sucrose benzoate. diethylene glycol dibenzoate and/or diethylene glycol benzoate in which about 50 to about 95% of all the hydroxyl groups have been esterified, phosphate plasticizers, for example t-butylphenyl diphenyl phosphate, polyethylene glycols and derivatives thereof, for example diphenyl ethers of poly(ethylene glycol), liquid resin derivatives, for example the methyl ester of hydrogenated resin, vegetable and animal oils, for example glycerol esters of fatty acids and polymerization products thereof. In one particularly preferred embodiment of the invention, the plasticizer used or the mixture of plasUcizers used is at least substantially biodegradable.

Various adhesive applications may require wax diluents in order to reduce melt viscosity or to modify the cohesion of the hotmelt adhesive without adversely affecting its adhesive properties.

Suitable waxes include, for example, N-(2-hydroxyhexyl)-12-hydroxystearamide, hydrogenated castor oil, oxidized synthetic waxes, N,N'-ethylene-bis-stearamide, poly(ethylene oxide) with a molecular weight ($M_n$) of more than about 1000 and functionalized synthetic waxes, such as Escomer® H101 (manufacturer: Exxon). If wax components are used as additives for the purposes of the present invention, biodegradable wax components are preferred.

A wax component and a plasticizer component may be present alongside one another as additives.

Stabilizers or antioxidants suitable for use as additives in accordance with the invention include hindered phenols of high molecular weight ($M_n$), polyhydric phenols and sulfur- and phosphorus-containing phenols. Phenols suitable for use as additives in accordance with the invention are, for example, 1,3,5-trimethyl-2,4,6-tris-(3,5-di-tert.butyl-4-hydroxybenzyl)-benzene; pentaerythritol-tetrakis-3-(3,5-ditert.butyl-4-hydroxyphenyl)-propionate; n-octadecyl-3,5-ditert.butyl-4-hydroxyphenyly)-propionate; 4,4-methylene-bis-(2,6-ditert.butylphenol); 4,4-thiobis-(6-tert.butyl-o-cresol); 2,6-ditert.butylphenol; 6-(4-hydroxyphenoxy)-2,4-bis-(n-octylthio)-1,3,5-triazine; di-n-otadecyl-3,5-ditert.butyl-4-hydroxybenzyl phosphonates; 2-(n-octylthio)-ethyl-3,5-ditert.butyl-4-hydroxybenzoate and sorbitol hexa-[3-(3,5-ditert.butyl-4-hydroxyphenyl)-propionate].

Other additives may be incorporated in the adhesives according to the invention in order to vary certain properties. Such additives include, for example, dyes, such as titanium dioxide, fillers, such as talcum, clay and the like. The adhesives according to the invention may optionally contain small quantities of thermoplastic polymers, for example ethylene/vinyl acetate (EVA), ethylene/acrylic acid, ethylene methacrylate and ethyle-n-enbutyl acrylate copolymers, which optionally provide the adhesive with additional flexibility, toughness and strength. It is also possible—and preferred in accordance with the invention—to add certain hydrophilic polymers, for example polyvinyl alcohol, hydroxyethyl cellulose, hydroxypropyl cellulose, polyvinyl methyl ether, polyethylene oxide, polyvinyl pyrrolidone, polyethyl oxazolines or starch or cellulose esters, more particularly the acetates with a degree of substitution of less than 2.5 which increase the wettability of the adhesives.

The adhesives according to the invention may be produced by conventional techniques known to the expert on the production of polymeric mixtures.

The adhesives according to the invention are preferably hotmelt adhesives. The adhesives may have pressure-sensitive properties although it is also possible and preferred in accordance with the invention to formulate the adhesives as hotmelt adhesives which do not have pressure-sensitive properties.

The adhesives according to the invention generally have a melt viscosity of about 500 to about 25,000 mPas (Brookfield RVT DVII, 140° C., spindle 27). Lower melt viscosities are possible although, in their case, application to the substrate to be bonded generally becomes difficuft unless suitable application techniques are used. The adhesives according to the invention may also have higher melt viscosities, although in that case they generally have to be applied at relatively high temperatures which can be a disadvantage for many of the substrates to be bonded.

The adhesives according to the invention have a softening point of about 70 to about 100° C. (as determined by the ring-and-ball method according to ASTM E 28). Particularly preferred softening points are, for example, about 75, 80, 85, 90 or 95° C.

The adhesive according to the invention is hydrophilic in the sense that its contact angle with water is in the range from 20 to 50° and preferably in the range from 27 to 38°. To measure the contact angle, a 100 to 200 μm thick adhesive layer is knife-coated onto silicone paper and tested by the following method:

The measurements are carried out with a Krüss "Kontaktwinkelmeßgerät G2 (G2 contact angle gauge)". To this end, one drop of each of four test liquids (water, glycerol, diethylene glycol, decalin) with known surface tensions is applied by syringe to a hotmelt film and the contact angle theta is measured at room temperature. The measurement is only made after there is no further change in the angle as a function of time (static contact angle).

The hydrophilia of the adhesive is based on the hydrophilia of the polyesters. It can be modified by varying their concentration of terminal groups and/or by using polyethylene glycol as alcohol component. The hydrophilia of the adhesive can of course also be influenced by additives, for example surfactants. Hydrophilic adhesives are desirable in the sanitary product industry because they can be expected to improve the transport of liquids, for example in diapers. The adhesive according to the invention is hydrophilic and additionally produces adequate adhesive strength between the polyolefin film and the nonwoven.

The present invention also relates to a process for the production of a composite material of at least two identical or different materials, characterized in that an adhesive containing components A and B, in which a) component A contains an amorphous polyester with a molecular weight ($M_n$) of at least 8000, component A having a total enthalpy of fusion of at most 20 mJ/mg and b) component B contains an amorphous polyester with a molecular weight ($M_n$) of less than 8000 and, more particularly, in the range from 1000 to 6500 and a glass transition temperature of at most 60° C. and, more particularly, in the range from −25 to 40° C., the adhesive having a melt viscosity of 500 to 25,000 mPas (Brookfield RVT DVII, 140° C., spindle 27) and a softening point of 70 to 100° C. (ASTM E28).

In the process according to the invention, the adhesive is generally applied in a quantity of about 0.1 to about 10 g/m$^2$, preferably in a quantity of about 1 to about 6 g/m$^2$ and more preferably in a quantity of about 3 to about 5 g/m$^2$ to at least parts of one of the substrates to be bonded. However, it is preferably applied to the surface as a whole.

For application, the adhesive according to the invention is heated to a temperature of about 100 to about 180° C. The temperature of the adhesive is determined by its viscosity and by the method of application used. For example, the adhesive may even be applied through a slot die. In this case, an adhesive temperature of about 130 to about 150° C., for example, has proved to be useful. Other methods of applying the adhesive according to the invention to the substrates to be bonded are the spiral spraying process and the control coat process, adhesive temperatures of about 150 to about 170° C. having proved to be useful.

The process according to the invention is suitable for bonding various materials. Thus, such materials as polyolefin films, for example polyethylene films or polypropylene films, polyolefin nonwovens, for example polyethylene nonwovens or polypropylene nonwovens, polyurv thane films, polyurethane foams, films or shaped articles of cellulose derivatives, for example tissues, films or shaped articles of polyacrylates or polymethacrylates, films or shaped articles of polyesters, can be bonded to one another. It is possible to bond both like materials and also different materials.

From the perspective of biodegradability, films and fibers (both endless and staple fibers), induding the nonwovens produced therefrom, of the following materials are preferred: polyesters, more particularly polylactide, polyhydroxybutryate, polyhydroxyvalerate, polycaprolactone, polyester urethane, polyester amide and materials based on starch and cellulose, for example thermoplastic starch and viscose. Consumer goods produced therefrom are readily biodegradable together with the adhesive according to the invention, for example packs, bags, packaging foams, medical articles, such as plasters and bandages, and sanitary articles, such as diapers, tampons, panty liners and sanitary napkins.

Web-form or sheet-form materials are preferably bonded to one another by the process according to the invention. The composite material produced in this way may comprise two or more layers.

In one preferred embodiment of the process according to the invention, at least one of the at least two like or different materials is a polyolefin. Thus, one example of a suitable substrate is a polyolefin film, more particularly a polyethylene film. The thickness of the substrate may vary within wide limits. Suitable substrates are, for example, polyethylene films with a thickness of about 10 to about 50 μm and, more particularly, about 20 to about 30 μm.

A nonwoven layer, preferably one containing or consisting of a polyolefin, is particularly suitable as the second material to be bonded to the substrate.

In the context of the present invention, a "nonwoven layer" is understood to be a flexible material which is not produced by conventional warp-weft weaving or by loop formation, but rather by the interlocking and/or cohesive and/or adhesive bonding of textile fibers. Accordingly, nonwovens are understood to be loose materials of spun fibers or filaments, generally of polypropylene, polyester or viscose, which are generally held together by the adhesion inherent in the fibers. The individual fibers may have a preferential orientation (oriented or cross-laid nonwovens) or no orientation (random-laid nonwovens). The nonwovens may be mechanically strengthened by needle punching, stitching or lacing by sharp jets of water (so-called spunlaced nonwovens). Adhesively strengthened nonwovens are formed by bonding the fibers with liquid binders (for example acrylate polymers, SBR/NBR, polyvinyl ester or polyurethane dispersions) or by melting or dissolving so-called binding fibers which have been added to the nonwoven during its production. In the case of cohesive strengthening, the fiber surfaces are dissolved by suitable chemicals and joined by pressure or welded at elevated temperature. Nonwovens of so-called spunbondeds, i.e. materials produced by spinning and subsequent deposition, blowing or floating on a conveyor belt, are known as spunbonded nonwovens. Nonwovens containing additional filaments, woven or knitted fabrics count as reinforced or strengthened nonwovens.

In one preferred embodiment of the process according to the invention, the adhesive is used for the production of a composite material containing at least one nonwoven layer. In a particularly preferred embodiment, the nonwoven layer is a polypropylene spunbonded with a weight per unit area of about 10 to about 30 g/m$^2$ and, more particularly, in the range from about 15 to about 20 g/m$^2$.

The adhesives according to the invention may be used in a number of applications, for example in packaging. In a particularly preferred embodiment, however, they are used in the production of composite materials, for example film/film, film/nonwoven and nonwoven/nonwoven composites, more particularly for the production of composite materials containing at least one nonwoven. Such composite materials include, in particular, disposable articles, for example diapers, hospital textiles, sanitary napkins, bed sheets and the like, preferably In the hygiene and medical fields.

The adhesives according to the invention are suitable for such applications by virtue inter alia of their resistance to lotions. In order to improve the skin-care properties of diapers, for example, their topsheets are treated with dermatologically compatible lotions. Lotion-coated diapers impose particular demands on the adhesive because the adhesion values of the adhesive bond can be affected by the coatings. For example, in the case of known adhesives based on SIS rubber, a marked reduction in the adhesion values of nonwoven/film laminates was observed after ca. 4 g/m$^2$ of a lotion based on fatty alcohol had been applied. The reduction was in the range from 30 to 70% after 24 hours at room temperature and in the range from 40 to 90% after 4 hours at 40° C.

Lotions of the type in question are described, for example, in WO 96/16682, of which the relevant disclosure is expressly included as part of the present application. The lotions in question are mixtures—semisolid to solid at 20° C.—of soothing agents based on fatty acid esters, alkyl ethoxylates, ethoxylated fatty acid esters, fatty alcohols, polysiloxanes and petroleum-based products and mixtures thereof with immobilizing agents, such as polyhydroxyfatty acid esters, polyhydroxyfatty acid amides, $C_{14-22}$ fatty alcohol, $C_{14-22}$ fatty alcohol ethoxylates, $C_{14-22}$ fatty acids and paraffin waxes and mixtures thereof. Auxiliaries may optionally be present to obtain other effects, including for example hydrophilic surface-active agents, viscosity controllers, perfumes, disinfectants, film formers, etc. The lotions should preferably have melting points in the range from about 40 to about 70° C. The adhesion values of the adhesives according to the invention are considerably more resistant to such lotions.

The invention is illustrated by the following Example.

EXAMPLES

Example 1

A high molecular weight amorphous polyester with a molecular weight ($M_n$) of more than 10,000 and a glass transition temperature $T_g$ of 2.6° C. obtainable from the reaction of diethylene glycol, ethylene glycol, isophthakic acid and adipic acid was used as component A. The polyester used as component A had a viscosity at 100° C. of 50 Pas and a viscosity at 140° C. of 9.9 Pas, an acid value of 6 and an OH value of 9.

A polyester consisting of phthalic acid, adipic acid, ethylene glycol and propane-1,2-diol in a ratio of 3.5:1.4:2.1:3.1 was used as component B1. The polyester had a glass temperature of 13° C. and a viscosity of 21.7 Pas at 90° C. (Brookfield CAP 2000, 90° C., cone 6, 50 r.p.m., measuring time 25 s).

A polyester consisting of terephthalic acid, adipic acid, isophthalic acid and butane-1,4-diol in a ratio of 1:1.1:1:3.3 was used as component B2. The polyester had a glass transition temperature $T_g$ of –20° C. and a softening temperature of 90° C.

Components A, B1 and B2 were mixed in a ratio of 1:0.5:1.

The adhesive had a contact angle with water of 31°.

The adhesive thus obtained was used to bond nonwoven (polypropylene spunbonded, density per unit area 17 g/m²) to polyethylene film (thickness 25 μm). To this end, the adhesive was applied to the polyethylene film through a slot die in a quantity of 4 g/m² at a temperature of 140° C. and at a rate of 20 m/min., after which the nonwoven was applied under a laminating pressure of 4 to 6 bar.

A test was then carried out to determine the adhesion value. To this end, a ca. 50 mm wide strip of the composite material thus obtained was stored in a conditioning chamber for 24 hours at 20° C./50% relative air humidity and then tested for adhesiveness in a tensile tester (traction angle 180°, traction rate 300 mm/min.). Material failure occurred in the nonwoven; the adhesive bond between the film and the nonwoven was not damaged.

The film/nonwoven laminate was uniformly coated with 4 g/m² fatty partial glycerides with a melting point of a) ca. 40° C. and b) ca. 70° C. After 24 hours at room temperature, the adhesion values were still high, i.e. were virtually unchanged. After 4 hours at 40° C., they had only fallen by 0 to 30%, i.e. ca. 30%, based on the tensile value of the nonwoven.

In a modified Bodis test (ISO 10708) for complete biodegradability, the adhesive according to the invention showed twice the degradability values of conventional adhesives based on rubber or APP.

Example 2

An adhesive was produced by mixing the following polyesters in the quantities indicated:
 2 parts of a polyester of terephthalic acid, adipic acid, isophthalic acid and butane-1,4-diol in a ratio of 1:1.1:1:3.3. The polyester had a glass transition temperature $T_g$ of –20° C. and a softening temperature of 90° C.

1.5 parts of a polyester of phthalic acid, adipic acid, ethylene glycol and propane-1,2-diol in a ratio of 3.5:1.4:2.1:3.1. The polyester had a glass temperature of 13° C. and a viscosity of 21.7 Pas at 90° C. (Brookfield CAP 2000, 90° C., cone 6, 50 r.p.m., measuring time 25 s) and 2 parts of polyester of diethylene glycol, ethylene glycol, isophthalic acid, adipic acid, sebacic acid, OH value 6, acid value 4, glass transition temperature $T_g$ ca. –1.8° C.

The contact angle was 30°.

Example 3

Laminates of a film based on thermoplastic starch on the one hand and the same film or a nonwoven based on lactic acid on the other hand were produced without difficulty by control coating of the adhesive of Example 1 according to the invention onto the nonwoven or the film at a temperature of 140° C.

The adhesion values of these laminates were so high in the case of film/film laminate that they could no be measured. In the case of the film/nonwoven laminate, they were substantially comparable with the values of laminates of conventional (nondegradable) substrates.

The adhesive and the shredded laminates were composted to DIN 54900, Part 2 (Draft), silica gel being used as carrier for the adhesive (20% adhesive on silica gel).

The adhesive according to the invention was almost completely degraded after 45 days, as indicated by the $CO_2$ formation rates based on test specimens. The shredded laminates were also almost completely degraded after 45 days, as indicated by the $CO_2$ formation rates based on test specimens and additional visual evaluation of the test material, i.e. there was no visible residue of the test specimens.

What is claimed is:

1. An adhesive composition comprising component A having a total enthalpy of fusion of at most 20 mJ/mg and component B having a glass transition temperature of at most 60° C. wherein a) component A comprises at least one aromatic-containing polyester with a molecular weight ($M_n$) of at least 8000 consisting essentially of (i) a first acid selected from the group consisting of succinic acid, glutaric acid, adipic acid, pimelic acid, suberic acid, azelaic acid, sebacic acid, maleic acid, fumaric acid, cyclohexane dicarboxylic acid, cyclohexene dicarboxylic acid, cyclohexadiene dicarboxylic acid, endomethylene hexahydrophthalic acid, cyclohexane tricarboxylic acid, phthalic acid, o-phthalic acid, isophthalic acid, terephthalic acid, trimellitic acid, anhydrides thereof, esters thereof with an alcohol containing from 1 to about 5 carbon atoms and combinations thereof; (ii) a second acid different from the first acid and selected from the group consisting of succinic acid, glutaric acid, adipic acid, pimelic acid, suberic acid, azelaic acid, sebacic acid, maleic acid, fumaric acid, cyclohexane dicarboxylic acid, cyclohexene dicarboxylic acid, cyclohexadiene dicarboxylic acid, endomethylene hexahydrophthalic acid, cyclohexane tricarboxylic acid, phthalic acid, o-phthalic acid, isophthalic acid, terephthalic acid, trimellitic acid, anhydrides thereof, esters thereof with an alcohol containing from 1 to about 5 carbon atoms, and combinations thereof, and (iii) at least one alcohol, wherein at least one of the first acid or second acid is an aromatic-containing acid; and b) component B comprises at least one polyester with a molecular weight ($M_n$) of less than 8000 consisting essentially of (i) a first acid selected from the group consisting of succinic acid, glutaric acid, adipic acid, pimelic acid, suberic acid, azelaic acid, sebacic acid, maleic acid, fumaric acid, cyclohexane dicarboxylic acid, cyclohexene dicarboxylic acid, cyclohexadiene dicarboxylic acid, endomethylene hexahydrophthalic acid, cyclohexane tricarboxylic acid, phthalic acid, o-phthalic acid, isophthalic acid, terephthalic acid, trimellitic acid, anhydrides thereof, esters thereof with an alcohol containing from 1 to about 5 carbon atoms and combinations thereof; (ii) a second acid different from the first acid and selected from the group consisting of succinic acid, glutaric acid, adipic acid, pimelic acid, suberic acid, azelaic acid, sebacic acid, maleic acid, fumaric acid, cyclohexane dicarboxylic acid, cyclohexene dicarboxylic acid, cyclohexadiene dicarboxylic acid, endomethylene hexahydrophthalic acid, cyclohexane tricarboxylic acid, phthalic acid, o-phthalic acid, isophthalic acid, terephthalic acid, trimellitic acid, anhydrides thereof esters thereof with an alcohol containing from 1 to about 5 carbon atoms and combinations thereof; and (iii) at least one alcohol, the adhesive having a melt viscosity of 500 to 25,000 mPas (Brookfield RVT DVII, 140° C., spindle 27) and a softening point of 70 to 100° C. (ASTM E28).

2. The adhesive composition of claim 1 wherein the alcohol of the polyester of component A is selected from the group consisting of ethylene glycol, neopentyl glycol, 1,2-propylene glycol, 1,3-propylene glycol, isomeric butylene glycol, pentane diols, hexane diols, dianhydrosorbitol, diethylene glycol, triethylene glycols and pure or mixed ethers thereof or reaction products thereof with $C_{1-4}$ alkylene oxides and combinations thereof.

3. The adhesive composition of claim 1 wherein the alcohol of the polyester of component B is selected from the group consisting of ethylene glycol, neopentyl glycol, 1,2-propylene glycol, 1,3-propylene glycol, isomeric butylene glycol, pentane diols, hexane diols, dianhydrosorbitol, diethylene glycol, triethylene glycols and pure or mixed ethers thereof or reaction products thereof with $C_{1-4}$ alkylene oxides and combinations thereof.

4. The adhesive of claim 1 wherein component B comprises an amorphous polyester with a molecular weight ($M_n$) of 1500 to 4000, a glass transition temperature $T_g$ of 5 to 20° C. and a viscosity of 5,000 to 25,000 mPas.

5. The adhesive of claim 1 wherein component B comprises an amorphous polyester with a molecular weight ($M_n$) of 400 to 4000 and a glass transition temperature $T_g$ of –40 to –15° C.

6. The adhesive of claim 1 wherein component B comprises an amorphous polyester with a molecular weight ($M_n$) of less than 500 and a glass transition temperature $T_g$ below –40° C.

7. The adhesive of claim 1 comprising:
30 to 95% by weight of component A,
5 to 75% by weight of component B, and,
0 to 45% by weight of at least one additive.

8. The adhesive of claim 1 wherein the adhesive is biodegradable.

9. The adhesive of claim 1 wherein the adhesive has a contact angle of 20 to 50°.

10. A method of making a composite material comprising at least two substrates, the method comprising:

providing an adhesive composition comprising component A having a total enthalpy of fusion of at most 20 mJ/mg and component B having a glass transition temperature of at most 60° C. wherein a) component A comprises at least one aromatic-containing polyester with a molecular weight ($M_n$) of at least 8000, and b) component B comprises at least one polyester with a molecular weight ($M_n$) of less than 8000, the adhesive having a melt viscosity of 500 to 25,000 mPas (Brookfield RVT DVII, 140° C., spindle 27) and a softening point of 70 to 100° C. (ASTM E28), applying the adhesive to at least part of a first substrate; and, contacting a second substrate with the adhesive applied to the first substrate.

11. The method of claim 10 wherein the adhesive is applied to the entire surface of the first substrate.

12. The method of claim 10 wherein the adhesive is applied to the first substrate in an amount of between about 0.1 to about 10 g/m².

13. The method of claim 10 wherein at least one of the first or second substrates is polyolefin.

14. The method of claim 10 wherein at least one of the first or second substrates is a nonwoven.

15. A composite comprising:

an adhesive composition sandwiched between a first and second substrate, the adhesive comprising component A having a total enthalpy of fusion of at most 20 mJ/mg and component B having a glass transition temperature of at most 60° C. in which a) component A comprises at least one aromatic-containing polyester with a molecular weight ($M_n$) of at least 8000, and b) component B comprises at least one polyester with a molecular weight ($M_n$) of less than 8000, the adhesive having a melt viscosity of 500 to 25,000 mPas (Brookfield RVT DVII, 140° C., spindle 27) and a softening point of 70 to 100° C. (ASTM E28).

16. The composite of claim 15 wherein the first and second substrates can be the same or different and are selected from the group consisting of polyolefin films, polyethylene films, polypropylene films, polyolefin nonwovens, polyethylene nonwovens, polypropylene nonwovens, polyurethane films, polyurethane foams, films or shaped articles of cellulose derivatives, films or shaped articles of polyacrylates or polymethacrylates, and films or shaped articles of polyesters.

17. The composite of claim 15 wherein the adhesive comprises
30–95% by weight of component A,
5–75% by weight of component B and
0–45% by weight of at least one additive.

* * * * *

UNITED STATES PATENT AND TRADEMARK OFFICE
CERTIFICATE OF CORRECTION

PATENT NO. : 6,713,184 B1  Page 1 of 1
DATED : March 30, 2004
INVENTOR(S) : Ferencz et al.

It is certified that error appears in the above-identified patent and that said Letters Patent is hereby corrected as shown below:

Title page,
Item [30], Foreign Application Priority Data, delete "197 63 474" and insert -- 197 53 474 --.

Signed and Sealed this

Fourteenth Day of February, 2006

JON W. DUDAS
*Director of the United States Patent and Trademark Office*